United States Patent [19]

Brown et al.

[11] 4,342,792
[45] Aug. 3, 1982

[54] ELECTRODES AND METHOD OF PREPARATION THEREOF FOR USE IN ELECTROCHEMICAL CELLS

[75] Inventors: David E. Brown, Weybridge; Stephen M. Hall, Feltham; Mahmood N. Mahmood, Walton-On-Thames, all of England

[73] Assignee: The British Petroleum Company Limited, London, England

[21] Appl. No.: 262,415

[22] Filed: May 11, 1981

[30] Foreign Application Priority Data

May 13, 1980 [GB] United Kingdom ............... 8015797

[51] Int. Cl.³ ........................................... B05D 5/12
[52] U.S. Cl. ................................. 427/34; 427/123; 427/126.3; 427/126.6; 427/377; 427/376.2; 427/376.3; 427/376.4; 427/376.5; 427/376.6; 427/226; 427/423; 204/290 R; 204/290 F
[58] Field of Search ............... 427/123, 126.3, 126.6, 427/377, 34, 423, 226, 376.2, 376.3, 376.4, 376.5, 376.6; 204/290 R, 290 F

[56] References Cited

U.S. PATENT DOCUMENTS

| | | | |
|---|---|---|---|
| 3,833,357 | 9/1974 | Bianchi et al. | 423/641 |
| 3,917,525 | 11/1975 | Bouy et al. | 204/290 F |
| 3,977,958 | 8/1976 | Caldwell et al. | 204/290 F |
| 4,076,611 | 2/1978 | Gray | 204/290 F |
| 4,245,017 | 1/1981 | Haering et al. | 427/226 |
| 4,281,048 | 7/1981 | Haering et al. | 427/226 |

Primary Examiner—John D. Smith
Assistant Examiner—Richard Bueker
Attorney, Agent, or Firm—Brooks, Haidt, Haffner & Delahunty

[57] ABSTRACT

This invention relates to novel electrodes and a method of preparation thereof for use in electrochemical cells. The novel electrodes contain a combination of electrocatalysts deposited on a metal substrate.

The electrocatalysts are deposited from a homogeneous solution of the compounds of (a) at least one metal selected from iron, cobalt, manganese and nickel, (b) at least one metal selected from molybdenum, vanadium and tungsten, and (c) at least one rare earth metal of the lanthanide group having an atomic number of 57-71 inclusive, the metal compounds are decomposed to the oxides and the oxide coated substrate cured at elevated temperature in a reducing atmosphere. The electrodes thus produced can be used as an anode or as a cathode in fuel cells and in cells for the electrolysis of water or brines.

10 Claims, 1 Drawing Figure

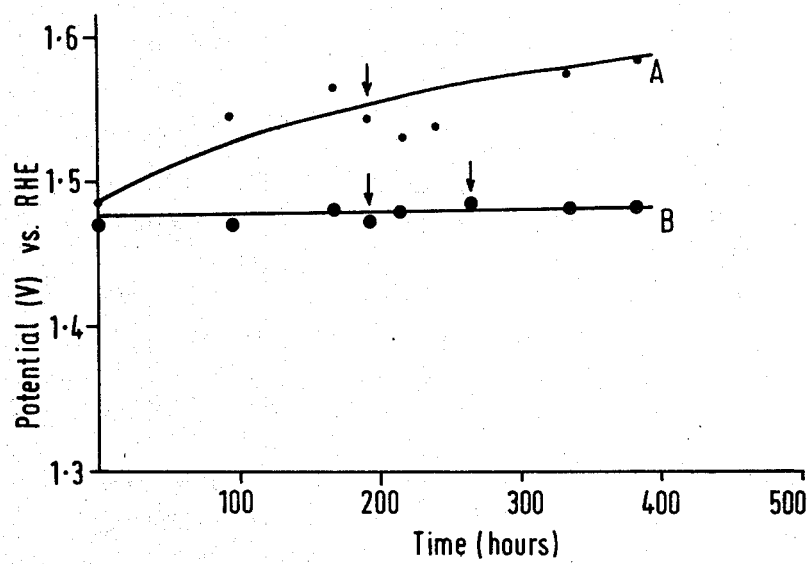

ELECTRODES AND METHOD OF PREPARATION THEREOF FOR USE IN ELECTROCHEMICAL CELLS

The present invention relates to a method of preparing active electrodes and in particular to such electrodes having improved efficiency and/or stability and the use thereof in electrochemical cells.

An electrochemical cell is a device which has as basic components at least one anode and one cathode and an electrolyte. The cell may use electrical energy to achieve a chemical reaction such as the oxidation or reduction of a chemical compound as in an electrolytic cell. Alternatively it can convert inherent chemical energy in a conventional fuel into low voltage direct current electrical energy as in a fuel cell. If the electrodes in such a cell are of relatively inexpensive material such as e.g. iron or nickel, they tend to have low activity. The activity can be improved by coating such electrodes with precious metal electrocatalysts such as e.g. platinum, iridium or ruthenium. The level of precious metal required for high activity and stability generally leads to high costs.

The above problems are particularly acute in electrochemical cells used for example for the electrolysis of water to produce hydrogen and oxygen. Hydrogen is a versatile raw material. It is for example a most desirable source of fuel and energy due to the clean and non toxic nature of its combustion products. In addition, it is used for example in the fertilizer, metallurgical, and petrochemical industries. Whilst demand for hydrogen is increasing, production costs from conventional sources are also increasing. Water is a natural resource which is readily and abundantly available and from which hydrogen can be produced by electrolysis. However, the cost of the electrocatalysts used hitherto has detracted from the commercial vaiability of the water electrolysis technology. Moreover, the currently used water electrolysers operate in a 25–30% alkaline solution at 70°–90° C. and exhibit a thermal efficiency of about 70% at practical current densities of about 200 mA/cm$^2$. The poor efficiency and low levels of operational current density are also responsible for the high capital costs of water electrolysers and the consequent high production costs of electrolytically produced hydrogen.

The thermal efficiency of a water electrolyser is governed by the over-potentials at the electrodes and the losses due to internal resistance at the inter-electrode gap.

Some of the problems of over-potential were mitigated until recently, only by using noble metals of Group VIII of the Periodic Table. Even these expensive metals presented problems. For example, ruthenium oxide electrodes when used for oxygen evolution dissolve in acidic and alkaline electrolytes. Those metals which do not dissolve during oxygen evolution will at least be covered with an oxide film and lose their activity. More recently, it has been shown in our co-pending European patent publication No; 0009406 that the problems of over-potential at the cathode, for example, can be mitigated by using less expensive metals as electrocatalysts. This publication discloses electrodes having deposited thereon electrocatalysts, for instance of the nickel-molybdenum type, from a homogeneous solution of their compounds which are initially thermally decomposed to their oxides and subsequently cured in a reducing atmosphere. The electrodes thus produced show a marked improvement over those disclosed hitherto. It has now been found that the performance and efficiency of these electrodes can be further improved by adding a third component to these electrocatalysts.

It is an object of the present invention to provide electrocatalysts which mitigate the problems of electrode over-potential, low current density, poor thermal efficiency and high capital costs.

Accordingly, the present invention is a method of producing electrodes having electrocatalysts deposited thereon comprising treating a metal electrode substrate so as to coat the substrate surface with a homogeneous solution of the compounds of (i) at least one metal selected from a first group of iron, cobalt, nickel and manganese, (ii) at least one metal selected from a second group of molybdenum, tungsten and vanadium, and (iii) at least one rare earth metal selected from the group of lanthanides having an atomic number of 57–71 inclusive, each of which compounds, when not an oxide, is capable of thermal decomposition to the corresponding metal oxide, thermally decomposing the metal compounds, other than the oxides, on the substrate to the corresponding oxides or mixed oxides and curing the oxide-coated substrate in a reducing atmosphere at elevated temperature.

According to a preferred embodiment the present invention is a method of producing electrodes having electrocatalysts deposited thereon comprising treating a metal electrode substrate so as to coat the substrate surface with a homogeneous solution as hereinafter defined of a nickel compound, a molybdenum compound and a compound of at least one rare earth metal selected from cerium and lanthanum, all of which are capable of thermal decomposition to the corresponding oxides or mixed oxides, thermally decomposing the metal compounds on the substrate surface to the corresponding oxides or mixed oxides, and curing the oxide-coated substrate in a reducing atmosphere at elevated temperature.

FIG. 1, the sole FIGURE, represents the results of a long term test of an electrode of the invention (B) as compared with an electrode not in accordance with the invention (A).

The term "homogeneous solution" as used here and throughout the specification is meant to embrace both liquid homogeneous solutions and homogeneous solids.

The metal electrode substrate on which the coating is carried out according to the present invention may be of a relatively inexpensive material such as for instance nickel, iron, copper, titanium, and alloys thereof or of other metallic substances plated with any of these materials. The substrate may be in the form of wire, tube, rod, planar or curved sheet, screen or gauze. If the electrode is to be used as a cathode the substrate may be nickel or iron whereas for use as an anode a nickel screen or nickel plated iron substrate is preferred.

The metals of which compounds are present in the homogeneous solution are compounds of (i) at least one metal selected from a first group of iron cobalt, nickel and manganese, (ii) at least one metal selected from a second group of molybdenum, vanadium and tungsten and (iii) at least one rare earth metal selected from the group of lanthanides having an atomic number of 57–71 inclusive. Each of the compounds present in the solution should be capable of thermal decomposition to the corresponding oxide. Examples of compounds which may be used include the nitrates and chlorides of the metals particularly those in the first and lanthanide groups and, specifically for those in the second group, the molybdates, tungstates, vanadates, such as e.g. ammonium paramolybdate, ammonium tungstate and ammonium metavanadate. In the homogeneous solution, the ratio of the metal atoms from the lanthanide group to the combined metal atoms of the first and second groups is suitably between 0.1:10 and 5:10, preferably between 1:10 and 1:4, and the ratio of the metal atoms of the first group to the metal atoms in the second group is suitably between 1:1 and 5:1.

The homogeneous solution of the metal compounds used for coating may be an intimate mixture of the respective solid metal compounds in their finely divided state, a solid solution of the metal compounds or a solution of the compounds in a solvent. An intimate mixture of the solid metal compounds may be prepared in advance or the compounds may be mixed immediately prior to contact with the substrate to be coated. An example of the latter case is when the respective metal compounds are sprayed separately but simultaneously on to the substrate; if premixed, the mixture may for example be sprayed from a single spray gun. In one technique the metal oxides themselves are directly sprayed onto the metal electrode substrates. In the case of solutions in solvents, the solvent may be aqueous such as for example water, acidic systems or aqueous ethanol, or organic, e.g. methanol, ethanol, propanol, isopropanol, formamide or dimethyl formamide. The choice of a particular solvent will depend upon the solubility of the desired metal compounds in the solvent.

In certain cases where aqueous systems are used, there may be a tendency for one or more of the metal compounds to separate by precipitation, particularly on standing the solution even for a relatively short time. For example an aqueous solution containing nickel nitrate, ceric nitrate and ammonium molybdate may need a small amount of nitric acid or citric acid to produce a clear solution.

If the homogeneous solution is a liquid it may be applied to the substrate surface to be coated for example by dipping, spraying, or brushing. The coated substrate is thereafter heated at elevated temperature to decompose the metal compounds into the corresponding oxides. The decomposition is suitably carried out in air at a temperature between 250° C. and 1200° C., preferably between 350° C. and 900° C. The operation of applying a coat of the homogeneous solution to the substrate followed by thermal decomposition may be repeated several times to ensure adequate coverage of the substrate surface with the metal oxides.

If, on the other hand, the homogeneous solution of the metal compound is a mixture of solids, whether or not premixed, it may be applied to the substrate by melt spraying techniques such as for example flame spraying or plasma spraying. If this type of techniques is used, the steps of coating the substrates with the metal compounds and thermal decomposition of the coating are both effected in a single step. This is due to the relatively high temperature associated with such techniques whereby the metal compounds may be expected to decompose to their oxides.

The substrate coated with the metal oxides, whether from a homogeneous liquid or a mixture of solids, is then cured by heating in an oven in a reducing atmosphere at a temperature between 250° C. and 700° C. The reducing atmosphere is preferably hydrogen and the heating temperature is preferably between 350° and 600° C. In particular, it would appear that optimum activity for the electrode, when used as the cathode, is achieved by reduction at a temperature around 500° C., whereas for use as an anode, the electrode is suitably reduced above 500° C., preferably around 600° C. Some variation in the optimum curing temperature may be achieved by varying the duration of the curing treatment.

By carrying out the process of the present invention the electrodes produced have a surprisingly high degree of activity and stability.

The steps of electrode preparation may be adapted to produce an appropriate level of catalyst loading on the substrate surface. The catalyst loading is suitably above 5 mg/cm$^2$ (based on the weight of the active species deposited on the substrate surface), preferably above 10 mg/cm$^2$. The eventual loading will depend upon the mechanical stability and integrity of the coating required, the substrate used and the cell in which the electrode is to be used. It has however been found that according to the present invention very low electrode potentials of the order of +1.48 V vs RHE will produce oxygen at a current density of 500 mA/cm$^2$ at 70° C. in 30% KOH solution. This degree of reduction in electrode potential will not only enable operation of the cells at high current density but will also significantly increase the economic efficiency of such cells.

One of the important features of the electrodes of the present invention is their resistance to oxidation. For example, a nickel-molybdenum-lanthanum electrode prepared from a nitric acid stabilized solution using a baking treatment in air at 275° C. showed no increase in overvoltage. That is, the initial potential in mV vs RHE at 500 mA/cm$^{-2}$ was 101 and remained substantially unchanged and stable.

The present invention is further illustrated with reference to the following Examples:

Examples

Electrode Preparation (Electrode Nos: 1-6)

Two separate homogeneous solutions were prepared with only the lanthanide group component being varied. Thus, measured volumes of nickel nitrate hexahydrate (2 molar), ammonium paramolybdate tetrahydrate (0.143 molar) and ceric nitrate (1.0 molar) or lanthanum nitrate (1.0 molar) were mixed together to give solutions with the required compositions. A few milliliters of concentrated nitric acid was added in each case to produce a clear, homogeneous solution.

Three clean 60 mesh Dutch Twill weave nickel screens were then coated each with the respective homogeneous solutions by dip-pyrolysis or spray pyrolysis as indicated in Table I below. The dip-pyrolysis was carried out by dipping the nickel screen substrate in the homogeneous solution and then heating in air in a furnace to 300°-900° C. The operation was repeated several times until a visibly satisfactory film of the metal oxides was formed on the nickel screen substrate. The oxide-coated nickel screen was then heated in a furnace under a reducing atmosphere of hydrogen at temperatures of about 500° C. for 1 hour.

The spray pyrolysis, where indicated in Table I, was carried out by applying the coating solution to each side of a clean substrate with a laboratory spray gun. The substrate was heated in an oven at 300°-900° C. for about 10 minutes and then allowed to cool to room temperature. The procedure was repeated until the required amount of coating had been deposited. Finally the resulting substrate was heated in an atmosphere of hydrogen at 500° C. for about 1 hour.

Electrochemical Measurements (Electrode Nos: 1–6)

The electrodes prepared as above were then used as anodes and the electrode potential in each case measured under anodic polarisation of 500 mA/cm$^2$ in 30% KOH solution at 70° C. The electrode potential measured for various electrodes of the present invention were compared with those for standard electrodes without the lanthanide component. The results are shown in the following Table I. All electrode potentials measured were iR corrected and are quoted with respect to Reversible Hydrogen Electrode (RHE). The results of long term stability tests carried out under anodic polarisation conditions referred to above are graphically shown in the FIGURE which compares the variation of electrode potential with time in respect of NiMo electrodes with and without cerium.

In Table I below, the following notations have been used:
(a)—Electrode prepared by spray-pyrolysis
(b)—Electrode prepared by dip-pyrolysis
(c)—Nickel screen was pickled in nitric acid before test.

coating solution. This was an aqueous solution of nickel nitrate, ammonium paramolybdate and lanthanum nitrate, to which nitric acid had been added to produce a clear green solution. The atomic ratio of Ni:Mo:La in the coating solution is listed for each electrode in Table II.

After spraying, decomposition was achieved by one of two routes:
(d) The sprayed specimen was dried at 100° C. in air for five minutes and then heated at 400° C. for five minutes in flowing nitrogen.
(e) The sprayed specimen was heated at 800° C. for 30 seconds to one minute either in a Bunsen burner flame or under flowing air in a furnace.

These procedures were repeated (approximately ten times) until the required catalyst loading had been achieved (35 to 40 mg cm$^{-2}$). The specimen was then reduced for one hour under flowing hydrogen at temperatures between 450° and 600° C.

Electrochemical Measurements (Electrode Nos: 7–18)

The electrodes were tested in an all-plastic cell containing 30 percent KOH at 70° C. The counter electrode was a nickel mesh and the saturated calomel electrode used as the reference electrode. All the electrode potentials were measured at 500 mA cm$^{-2}$. They were iR corrected by the interrupter technique and are quoted with respect to the reversible hydrogen electrode (RHE).

TABLE 1

List of test electrodes and their electrode potentials under an anodic polarisation of 500 mA/cm$^2$ in 30% KOH at 70° C.

| Electrode Number | Electrocatalyst Composition (Atomic Ratio) | Substrate | Reduction Temperature °C. | loading mg/cm$^2$ | Potential at 500 mA/cm$^2$ (vs RHE) Initial | After x hours |
|---|---|---|---|---|---|---|
| 1* | (c) Ni Screen | Ni | — | — | 1.63 | 1.78(x = 168) |
| 2* | (a) NiMo = 60/40 | Ni | 500 | 30 | 1.48 | 1.585(x = 384) |
| 3 | (b) NiCeMo = 59.5/14.9/25.6 | Ni | 500 | 33 | 1.47 | 1.48(x = 384) |
| 4* | (a) NiMo | Ni | 500 | 30 | 1.48 | 1.605(x = 240) |
| 5 | (b) NiCeMo = 63/10/27 | Ni | 500 | 46.4 | 1.48 | 1.485(x = 168) |
| 6 | (b) NiLaMo = 63/10/27 | Ni | 500 | 37 | 1.48 | 1.475(x = 240) |

*Comparative test not according to the invention.

Electrode Preparation (Electrode Nos: 7–18)

14 mm×14 mm samples of either nickel gauze with a 60 mesh Dutch Twill weave were sprayed with the The results achieved in terms of the use of the electrodes as anodes or cathodes is shown in Table II below.

TABLE II

ACTIVITY OF NiMoLa COATINGS ON NICKEL SUBSTRATES

| Electrode | Composition Ni/Mo/La | Acid | Preparative Method | Temperature °C. Drying | Decomposition | Reduction | Anode Potential mV vs RHE at 500 mA cm$^{-2}$ Initial | Final | Cathode Potential mV vs RHE at 500 mA cm$^{-2}$ Initial | Final |
|---|---|---|---|---|---|---|---|---|---|---|
| 7 | 57/38/5 | Nitric | (e) | — | 800 | 500 | 1.519 | 1,508(96 h) | −54 | −95(192 h) |
| 8 | 57/38/5 | Nitric | (e) | — | 800 | 600 | 1.486 | 1,547(96 h) | −97 | −120(72 h) |
| 9 | 54/36/10 | Nitric | (e) | — | 800 | 500 | 1.526 | 1,532(24 h) | −37 | −54(1272 h) |
| 10 | 51/34/15 | Nitric | (e) | — | 800 | 500 | 1.519 | 1.549(72 h) | −97 | −124(72 h) |
| 11 | 51/34/15 | Nitric | (e) | — | 800 | 615 | 1.522 | 1.553(24 h) | −109 | −129(24 h) |
| 12 | 52/30.5/17.5 | Nitric | (e) | — | 800 (Flame) | 500 | 1.474 | 1.485(2040 h) | −63 | −64(2040 h) |
| 13 | 52/30.5/17.5 | Nitric | (d) | 100 | 400 | 500 | 1.47 | 1.55(480 h) | −93 | −101(3936 h) |
| 14 | 52/30.5/17.5 | Nitric | (e) | — | 800 (Flame) | 600 | 1.458 | 1.491(1896 h) | −80 | −116(336 h) |

TABLE II-continued

ACTIVITY OF NiMoLa COATINGS ON NICKEL SUBSTRATES

| Electrode | Composition Ni/Mo/La | Acid | Preparative Method | Temperature °C. Drying | Temperature °C. Decomposition | Temperature °C. Reduction | Anode Potential mV vs RHE at 500 mA cm$^{-2}$. Initial | Anode Potential mV vs RHE at 500 mA cm$^{-2}$. Final | Cathode Potential mV vs RHE at 500 mA cm$^{-2}$. Initial | Cathode Potential mV vs RHE at 500 mA cm$^{-2}$. Final |
|---|---|---|---|---|---|---|---|---|---|---|
| 15 | 52/30.5/17.5 | Nitric | (d) | 100 | 400 | 600 | 1.46 | 1.48(3000 h) 1.53(4176 h) | — | −150(100 h) |
| 16 | 48/32/20 | Nitric | (e) | — | 800 | 600 | 1.490 | 1.525(360 h) | −76 | −119(192 h) |
| 17 | 48/32/20 | Nitric | (d) | 100 | 400 | 450 | 1.51 | 1.54(150 h) | −30 | −70(24 h) |
| 18 | 64/16/20 | Nitric | (d) | 100 | 400 | 450 | 1.54 | 1.56(50 h) | −53 | −115(4000 h) |

We claim:

1. A method of producing electrodes having electrocatalysts deposited thereon comprising coating a metal electrode substrate with a homogeneous solution of a plurality of metal compounds each of which compound, when not an oxide, being capable of thermal decomposition to the corresponding oxide, thermally decomposing the metal compounds, other than the oxides, to the corresponding oxides or mixed oxides and curing the oxide-coated substrate in a reducing atmosphere at an elevated temperature, characterised in that the homogeneous solution comprises compounds of (a) at least one metal selected from a first group of iron, cobalt, manganese and nickel, (b) at least one metal selected from a second group of molybdenum, vanadium and tungsten and (c) at least one rare earth metal selected from the group of lanthanides having an atomic number of 57–71 inclusive.

2. A method according to claim 1 wherein the homogeneous solution comprises compounds of nickel, molybdenum and at least one rare earth metal selected from cerium and lanthanum.

3. A method according to claim 2 wherein the ratio of the metal atoms from the first group to the metal atoms from second group in the homogeneous solution is between 1:1 and 5:1.

4. A method according to claim 2 wherein the ratio of the rare earth metal atoms to the combined metal atoms from the first and second groups is between 0.1:10 and 5:10.

5. A method according to claim 4 wherein the ratio of the rare earth metal atoms to the combined metal atoms from the first and second groups is between 1:10 and 1:4.

6. A method according to claim 2 wherein the homogeneous solution is an aqueous solution comprising nickel nitrate, ammonium paramolybdate and ceric nitrate or lanthanum nitrate and contains in addition nitric acid or citric acid.

7. A method according to claim 1 wherein the homogeneous solution is applied to the substrate surface by a melt spraying technique selected from flame spraying and plasma spraying.

8. A method according to claim 7 wherein the homogeneous solution is an intimate mixture of the metal oxides which is sprayed directly onto the susbtrate surface.

9. A method according to claim 1 wherein the substrate surface coated with the metal oxides is cured by heating in an atmosphere of hydrogen at a temperature between 250° and 700° C.

10. A method according to claim 9 wherein the curing of the oxide coated substrate in a reducing atmosphere converts at least some of the oxides to a metallic state.

* * * * *